Feb. 7, 1956  B. C. RIVERS  2,733,864
TEMPERATURE CONTROLLING MEANS FOR INTERNAL-COMBUSTION ENGINES
Filed Dec. 21, 1954

INVENTOR
BERNARD C. RIVERS

BY
*Young and Wright*
ATTORNEYS

United States Patent Office 2,733,864
Patented Feb. 7, 1956

2,733,864

TEMPERATURE CONTROLLING MEANS FOR INTERNAL-COMBUSTION ENGINES

Bernard C. Rivers, Milwaukee, Wis.

Application December 21, 1954, Serial No. 476,669

2 Claims. (Cl. 236—34)

This invention appertains to an improved thermostatic means for controlling the flow of water in an engine cooling system and more particularly, to a device adapted to be installed in the conduit through which the cooling water flows from the engine to the radiator.

Heretofore, in engine cooling systems, it has been the practice to utilize a thermostatic valve responsive to the temperature of the cooling liquid in the engine for controlling the flow of the fluid from the engine block to the radiator.

In parts of the country where there is a considerable temperature change between summer and winter, it has been found necessary to change the thermostat with the season change. In other words, a thermostat responsive to a relatively higher temperature was utilized in winter or cooler weather, while in the summertime when the engine heats up faster, a thermostat responsive to a lower temperature was utilized so that the engine would not overheat before the thermostat opened and allowed the water or cooling fluid to flow to the radiator. Obviously, the changing of the thermostat not only consumed time and effort but usually resulted in injury to the thermostat itself and consequently a new thermostat had to be installed with each change. In some instances, only a high temperature thermostat was utilized and this thermostat was removed during the summer and the engine allowed to run with no thermostat at all. However, this practice is not recommended in that it resulted in unnecessary wear and damage to the engine.

Therefore, a primary object of my present invention is to provide a device whereby the flow of the cooling liquid may be controlled as desired so that in the summertime the flow of the cooling liquid from the engine block to the radiator will be quicker than the flow during the winter months.

Another important object of my present invention is to provide a device for supporting two thermostats, each located in a separate channel, with means for controlling the flow of the cooling liquid past either one thermostat or the other.

Still another object of my present invention is to provide a high temperature thermostat in one channel and a low temperature themostat in another channel with a valve means adapted to shut off the flow of cooling liquid past the low temperature thermostat during the winter months.

A further cbject of the invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing in which.

Figure 1:
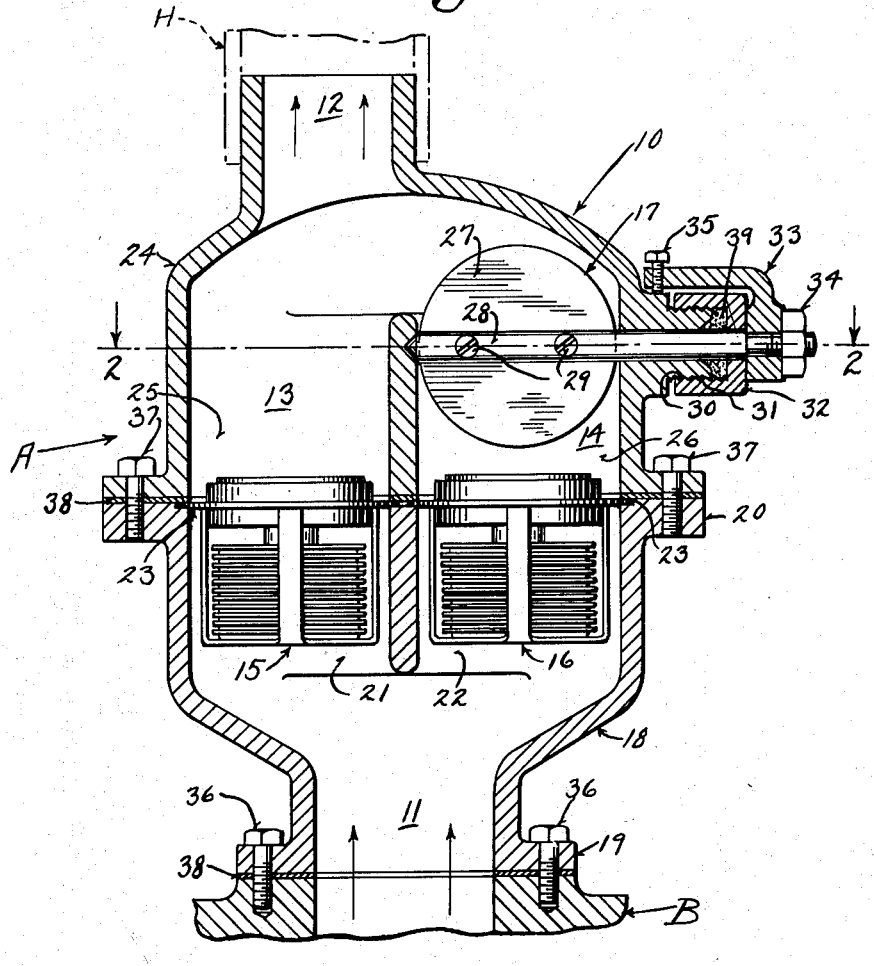
Figure 1 is a vertical sectional view of my device shown in its proper position on the engine's water jacketed cylinder block, the section being represented by the lines 1—1 of Figure 2 of the drawing.

Referring now to the drawing in detail wherein similar reference characters designate corresponding parts throughout the several views, the letter A generally indicates one type of my improved device and the same includes, broadly, an outer casing 10 having a water inlet 11, a water outlet 12, channels 13 and 14, thermostats 15 and 16, and a butterfly valve 17. In the preferred form of my invention the casing 10 is formed from two castings, a lower casting 18 and an upper casting 24. The lower base casting 18 is provided with the water inlet 11 and upper and lower peripheral flanges 19 and 20 respectively. This casting 18 also includes separate channel portions 21 and 22 and the upper inner periphery of each channel portion is recessed at 23 so that a thermostat may be supported therein. The upper casting 24 includes the water outlet 12 and channel portions 25 and 26 respectively.

Located in the upper channel portion 26 of the channel 14 is the valve assembly 17 and the same includes a butterfly disc 27 which is secured to the shaft 28 by means of the screws 29. The shaft 28 extends through the protruding portion of the casting 30. It is to be noted that the protruding portion 30 is provided with screw threads 31 for the reception of the packing nut 32. Splined to the outer end of the shaft 28 is an actuating arm 33 and a lock nut 34, which is provided to hold the arm to the shaft. The outer end of the actuating arm is provided with a lock bolt 35 adapted to hold the actuating arm in the desired adjustment.

While it is obvious that the lower casting 18 could be made integral with the engine block it is preferred that the same be bolted to the block by means of the bolts 36 and likewise the top casting 24 is fastened by means of the bolts 37. Suitable packing members such as gaskets 38 and packing material 39 is utilized to prevent liquid leaks in the device.

In the operation of my device, the lower temperature thermostat 16 is mounted in the channel controlled by the butterfly valve 17, while the high temperature thermostat is mounted in the unobstructed channel 13.

Figure 2:
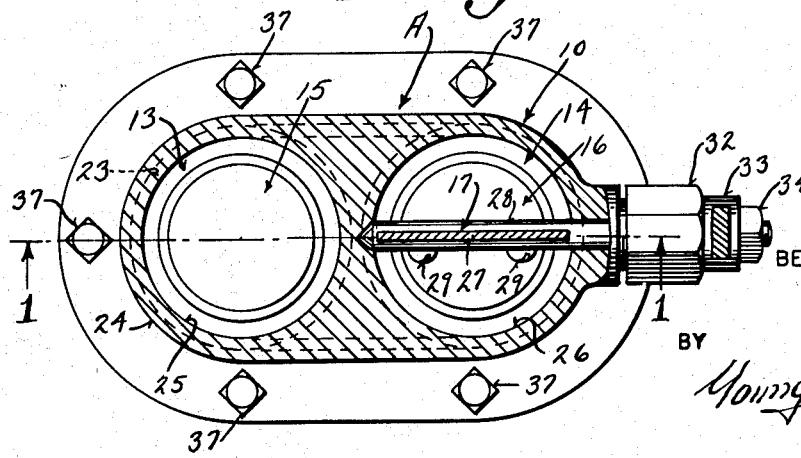
Figure 2 is a horizontal sectional view taken on the lines 2—2 of Figure 1 and looking in the direction of the arrows.

As previously stated, it is desired to use the low temperature thermostat during the summer months and warm weather operation, and the butterfly valve will be in its opened position as illustrated in Figures 1 and 2. This will permit the cooling liquid to pass through the channel 14 as it is obvious that the lower temperature thermostat 16 will open prior to the opening of the high temperature thermostat 15.

However, for operation in the winter or cooler weather, the butterfly valve will be turned to its closed position and therefore the cooling liquid will flow from the engine block B through the hose in the direction of the arrows to the engine only upon the opening of the high temperature thermostat 15 in the channel 13.

It is important to note that the butterfly valve is situated above the low temperature thermostat so that regardless of whether or not the valve is opened or closed, cooling liquid will always surround both thermostats. This will prevent the drying out of the thermostats or the undue expansion and rupturing of the diaphragm material. In extremely hot climates, the low temperature thermostat may be placed in the channel 13 and no thermostat will be needed in the channel 14 so that in extremely hot weather the butterfly valve 17 may be opened and the cooling liquid will flow unobstructed from the engine to the radiator.

Obviously, various changes in details may be made, such as changes in the angles of inlet and outlet to conserve space or accommodate various designs of engines and certain portions may be built into the engine proper without departing from the spirit or scope of this invention, but what I claim as new is:

1. In an engine cooling system, means for controlling the flow of a coolant through a conduit leading from the engine to a radiator, comprising an outer casing section in the conduit having two separate channels therein connected with a common inlet and a common outlet, each channel being of a size and configuration to support a thermostatic valve, a high temperature thermostat in one channel, a low temperature thermostat in the other channel, and a manually operated independent valve adapted in one position to close off the flow of a coolant in the channel having the low temperature thermostat.

2. In an engine cooling system, means for controlling the flow of a coolant through a conduit leading from the engine to a radiator, comprising an outer casing section in the conduit having two separate channels therein connected with a common inlet and a common outlet, each channel being of a size and configuration to support a thermostatic valve, a high temperature thermostat in one channel, a low temperature thermostat in the other channel, and a manually operated butterfly valve adapted in one position to close off the flow of coolant in the channel having the low temperature thermostat, said butterfly valve being positioned in relation to the low temperature thermostat so as to close off said channel after the coolant has passed through the low temperature thermostat.

References Cited in the file of this patent

UNITED STATES PATENTS

| | | |
|---|---|---|
| 1,850,963 | Sponar | Mar. 22, 1932 |
| 2,137,136 | Giesler | Nov. 15, 1938 |

FOREIGN PATENTS

| | | |
|---|---|---|
| 411,236 | Germany | Mar. 25, 1925 |